(12) United States Patent
Morioka et al.

(10) Patent No.: US 8,455,083 B2
(45) Date of Patent: Jun. 4, 2013

(54) PRESSURE-SENSITIVE ADHESIVE SHEET

(75) Inventors: Takashi Morioka, Tokyo (JP); Naokl Taya, Tokyo (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 13/637,082

(22) PCT Filed: Mar. 24, 2011

(86) PCT No.: PCT/JP2011/057164
§ 371 (c)(1),
(2), (4) Date: Oct. 23, 2012

(87) PCT Pub. No.: WO2011/122437
PCT Pub. Date: Oct. 6, 2011

(65) Prior Publication Data
US 2013/0040100 A1   Feb. 14, 2013

(30) Foreign Application Priority Data
Mar. 29, 2010 (JP) ................. 2010-074900

(51) Int. Cl.
*B32B 3/10* (2006.01)
(52) U.S. Cl.
USPC ............ 428/138; 428/137; 428/134; 428/136
(58) Field of Classification Search
USPC .................. 428/138, 137, 134, 136
See application file for complete search history.

(56) References Cited

U.S. PATENT DOCUMENTS
2008/0014407 A1   1/2008   Katoh et al.

FOREIGN PATENT DOCUMENTS

| JP | 2002-114951 A | 4/2002 |
|---|---|---|
| JP | 2005-343908 A | 12/2005 |
| JP | 2006-001951 A | 1/2006 |
| JP | 2006-315296 A | 11/2006 |
| WO | 2004/061032 A1 | 7/2004 |
| WO | 2005/116156 A1 | 12/2005 |
| WO | 2005/121268 A1 | 12/2005 |
| WO | 2007/069330 A1 | 6/2007 |
| WO | 2010/100978 A1 | 9/2010 |

OTHER PUBLICATIONS

The International Search Report of the International Searching Authority mailed Jun. 28, 2011 for the corresponding international application No. PCT/JP2011/057164 (with English translation).

*Primary Examiner* — Michael C Miggins
(74) *Attorney, Agent, or Firm* — Posz Law Group, PLC

(57) ABSTRACT

A pressure-sensitive adhesive sheet includes a base material and a pressure-sensitive adhesive layer and is formed therein with a plurality of through-holes passing through from one surface to the other surface. The base material includes a first layer positioned on a side of the pressure-sensitive adhesive layer and a second layer positioned on an opposite side of the pressure-sensitive adhesive layer. The first layer includes a resin composition containing 50 to 88 wt % of a polyolefin-based resin (A); 10 to 48 wt % of a styrene-based resin and/or an acrylic-based resin (B) excluding the polyolefin-based resin (A); and 2.0 to 30 wt % of a pigment (C), and the second layer contains a polyolefin-based ionomer resin (D) as a main constituent, and the ratio of thickness between the first layer and the second layer is 80:20 to 97:3.0.

20 Claims, 2 Drawing Sheets

PRESSURE-SENSITIVE ADHESIVE SHEET

CROSS REFERENCE TO RELATED APPLICATIONS

This application is a U.S. national stage application of PCT/JP2011/057164 filed on Mar. 24, 2011, and claims priority to, and incorporates by reference, Japanese Patent Application No. 2010-074900 filed on Mar. 29, 2010.

TECHNICAL FIELD

The present invention relates to a pressure-sensitive adhesive sheet which allows for preventing or removing, for example, air entrapments and/or blisters.

BACKGROUND ART

When a pressure-sensitive adhesive sheet is manually applied to an adherend, air entrapments may occur between the adherend and the pressure-sensitive adhesive face thereby to detract the appearance of the pressure-sensitive adhesive sheet. Such air entrapments readily occur, particularly when the surface area of the pressure-sensitive adhesive sheet is large.

In addition, resin materials such as acrylic resin, ABS resin, polystyrene resin and polycarbonate resin may generate gases due to heating or other treatments, and if a pressure-sensitive adhesive sheet is applied to an adherend comprising such resin materials, then the gas generated from the adherend will cause blisters (swelling) between the adherend and the pressure-sensitive adhesive sheet.

In order to solve such problems as described above, a pressure-sensitive adhesive sheet has been proposed which is formed therein with through-holes having a hole diameter of 0.1 to 300 μm with a hole density of 30 to 50,000 holes/100 $cm^2$ (Patent Document 1). Such a pressure-sensitive adhesive sheet causes air and gases on the side of the pressure-sensitive adhesive face to escape via the through-holes towards the side of the surface of the pressure-sensitive adhesive sheet, thereby to allow for preventing air entrapments or blisters in the pressure-sensitive adhesive sheet.

In the pressure-sensitive adhesive sheet of Patent document 1, however, through-holes would possibly be visible by the naked eye depending on the hole diameter of the through-holes and/or the material of the base material, so that the appearance of the pressure-sensitive adhesive sheet might have not been necessarily good.

Accordingly, a pressure-sensitive adhesive sheet has been proposed in which a base material defined with its surface roughness (Ra), chroma (C*), lightness (L*) and contrast ratio is used, as well as defined with the hole diameter of through-holes in the base material and a pressure-sensitive adhesive layer, the hole diameter of the through-holes at the surface of the base material, the outer diameter of melted portions formed by laser around the through-holes at the surface of the base material, and the outer diameter of thermally deformed portions formed by laser around the through-holes or around the melted portions at the surface of the base material (Patent Document 2). The appearance of such a pressure-sensitive adhesive sheet is basically comparable to that of a pressure-sensitive adhesive sheet having no through-holes.

Patent Document 1: Domestic re-publication of PCT international application No. 2004/061032

Patent Document 2: Domestic re-publication of PCT international application No. 2005/121268

SUMMARY OF THE INVENTION

Problem to be Solved by the Invention

Actually, the formation of through-holes in the above pressure-sensitive adhesive sheet may employ a hole-forming process using laser. Among laser hole-forming processes, a carbon dioxide laser process differs from laser ablation processes and is a so-called laser thermal process, which is a method to undergo a decomposition process of materials caused by heat.

When the above laser thermal process is performed for a resin film of which the base material is comprised of a polyolefin such as polyethylene or polypropylene, or a polyolefin-based thermoplastic elastomer, the material is merely molten during the laser light irradiation before being decomposed due to heat to vapor away, thereby expanding the inner diameter of the through-holes, because the thermal decomposition temperature of the material is high while the melting temperature is low. As the inner diameter of the through-holes becomes large in such a manner, the appearance of the pressure-sensitive adhesive sheet may be deteriorated due to sinking at the periphery of openings of the through-holes.

Also in the pressure-sensitive adhesive sheet of Patent Document 2, the inner diameter of the through-holes would be expanded depending on the material of the base material thereby leading to problems as described above (particularly in the base material of Example 16 in Patent Document 2).

Meanwhile, such a pressure-sensitive adhesive sheet as described above may often be provided thereon with a coat layer by coating over the surface of the base material in order to prevent the surface from being scratched. However, in a case where shrinkage force caused by forming the coat layer was accumulated as a residual stress, the counter force for releasing the residual stress would curl the pressure-sensitive adhesive sheet. Moreover, if a heterogeneous material such as the coat layer was coated on the base material, sufficient adhesiveness could not been obtained therebetween, and notably in the case where the pressure-sensitive adhesive layer was expanded at the time of applying, delamination would occur between the base material and the coat layer or cracks would be generated. This tendency is significant particularly in an olefin-based base material because it has poor adhesiveness with the coat layer.

The present invention has been created in view of such circumstances, and objects thereof include providing an olefin-based pressure-sensitive adhesive sheet in which air entrapments and blisters can be prevented or removed via through-holes and the inner diameter of the through-holes is suppressed from being expanded thereby to provide a good appearance, and which has an excellent scratch-resistance performance without problems of delamination and cracks when being expanded.

Means for Solving the Problem

In order to achieve the above objects, the present invention provides a pressure-sensitive adhesive sheet comprising a base material and a pressure-sensitive adhesive layer and formed therein with a plurality of through-holes passing through from one surface to other surface, the base material comprising a first layer positioned on a pressure-sensitive adhesive layer-side and a second layer positioned on a side opposite to the pressure-sensitive adhesive layer, the first layer comprising a resin composition, the resin composition containing: 50 to 88 wt % of a polyolefin-based resin (A); 10 to 48 wt % of a styrene-based resin and/or an acrylic-based resin (B) excluding the polyolefin-based resin (A); and 2.0 to 30 wt % of a pigment (C), the second layer containing a polyolefin-based ionomer resin (D) as a main constituent, the ratio of thickness between the first layer and the second layer being 80:20 to 97:3.0 (Invention 1).

Conceptually, the term "sheet" as used herein includes films, and the term "film" includes sheets.

According to the above invention (Invention 1), and particularly according to the presence of the first layer, the inner diameter of through-holes can be suppressed from being expanded even if the through-holes are formed by a thermal process such as a laser thermal process, and thereby, the appearance of the pressure-sensitive adhesive sheet is prevented from being deteriorated due to sinking of the periphery of openings of the through-holes. In addition, the presence of the second layer provides an excellent scratch-resistance performance without using an additional coat layer, the first and second layers exhibit good adhesiveness therebetween because both the layers are of olefin-based, and problems such as delamination and cracks do not occur even when the pressure-sensitive adhesive sheet is expanded.

In the above invention (Invention 1), it is preferred that the second layer comprises a resin composition containing 97 to 100 wt % of the polyolefin-based ionomer resin (D) and 0 to 3 wt % of a pigment (E) (Invention 2).

In the above invention (Invention 1, 2), it is preferred that the polyolefin-based resin (A) is an ethylene-based copolymer including an ethylene structure as a structural unit (Invention 3).

In the above invention (Invention 1 to 3), it is preferred that the polyolefin-based resin (A) is an ethylene-(meth)acrylic acid copolymer (Invention 4).

In the above invention (Invention 1 to 4), it is preferred that the pigment (C) has an absorption peak within a wavelength region of a carbon dioxide laser (Invention 5).

In the above invention (Invention 1 to 5), it is preferred that the pigment (C) is at least one selected from the group of inorganic pigments (Invention 6).

In the above invention (Invention 1 to 6), it is preferred that the pigment (C) is carbon black (Invention 7).

In the above invention (Invention 1 to 7), it is preferred that the through-holes are formed by a thermal process (Invention 8).

In the above invention (Invention 8), it is preferred that the thermal process is a laser thermal process (Invention 9).

In the above invention (Invention 9), it is preferred that the laser used in the laser thermal process is a carbon dioxide laser (Invention 10).

In the above invention (Invention 1 to 10), it is preferred that a hole diameter of the through-holes at a surface of the base material is smaller than a hole diameter of the through-holes at a pressure-sensitive adhesive face of the pressure-sensitive adhesive layer (Invention 11).

Advantageous Effect of the Invention

The present invention provides a pressure-sensitive adhesive sheet in which air entrapments and blisters can be prevented or removed and the inner diameter of through-holes can be suppressed from being expanded even if the through-holes are formed by a thermal process such as a laser thermal process. In such a pressure-sensitive adhesive sheet, the appearance of the pressure-sensitive adhesive sheet is prevented from being deteriorated due to sinking of the periphery of openings of the through-holes. Further, in the pressure-sensitive adhesive sheet according to the present invention, the second layer at the base material surface imparts an excellent scratch-resistance performance without using an additional coat layer, the first and second layers exhibit good adhesiveness therebetween because both the layers are of olefin-based, and problems such as delamination and cracks do not occur even when the pressure-sensitive adhesive sheet is expanded.

MODE FOR CARRYING OUT THE INVENTION

Hereinafter, embodiments of the present invention will be described.

[Pressure-Sensitive Adhesive Sheet]

Figure 1:
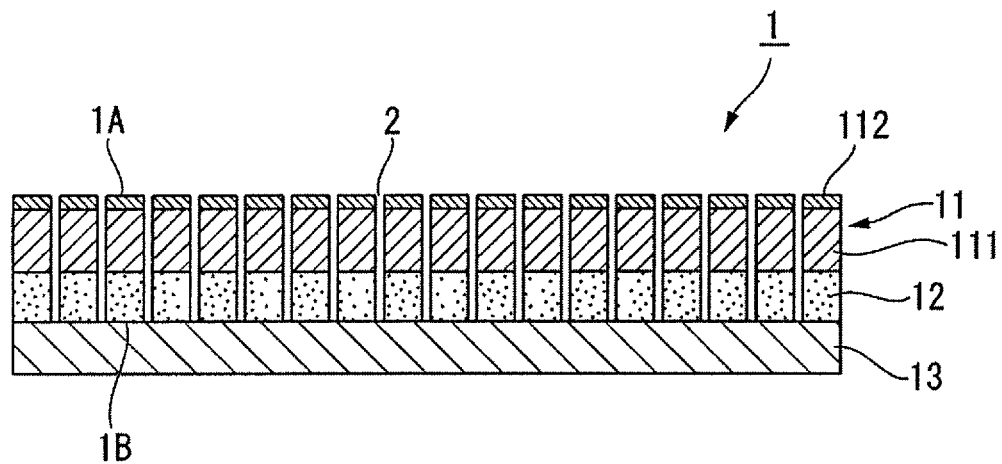
FIG. 1 is a cross-sectional view of a pressure-sensitive adhesive sheet according to one embodiment of the present invention.

FIG. 1 is a cross-sectional view of a pressure-sensitive adhesive sheet according to one embodiment of the present invention.

As shown in FIG. 1, pressure-sensitive adhesive sheet 1 according to the present embodiment is obtained by laminating a base material 11, a pressure-sensitive adhesive layer 12, and a release liner 13. The base material 11 comprises a first layer 111 positioned on a pressure-sensitive adhesive layer 12-side, and a second layer 112 positioned on a side opposite to the pressure-sensitive adhesive layer 12 (the surface side of the pressure-sensitive adhesive sheet 1 or the base material 11). Note that the release liner 13 is to be removed when use of the pressure-sensitive adhesive sheet 1.

This pressure-sensitive adhesive sheet 1 is formed therein with a plurality of through-holes 2 which pass through the base material 11 and the pressure-sensitive adhesive layer to extend from a base material surface 1A to a pressure-sensitive adhesive face 1B. During use of the pressure-sensitive adhesive sheet 1, air between an adherend and the pressure-sensitive adhesive face 1B of the pressure-sensitive adhesive layer 12, and/or gas generated from the adherend, may be escaped via the through-holes 2 out of the base material surface 1A, thereby to prevent air entrapments and blisters from occurring or to easily remove air entrapments having been generated, as will be described below.

The first layer 111 of the base material 11 is comprised of a resin composition containing a polyolefin-based resin (A), a styrene-based resin and/or an acrylic-based resin (B) excluding the polyolefin-based resin (A) (which may hereinafter be referred to as "resin (B)"), and a pigment (C).

The polyolefin-based resin (A) is a polymer having been polymerized or copolymerized using at least olefin-based hydrocarbon as a building monomer, and examples thereof thus include copolymers with other monomers such as (meth)acrylic acid and (meth)acrylic acid ester. Note that the term "(meth)acrylic acid" as used herein is intended to mean both acrylic acid and methacrylic acid. The same is true for other similar terms.

The polyolefin-based resin (A) may be selected from any known polyolefin-based resins, such as homopolymers of ethylene, propylene, butene-1,3-methylbutene-1,3-methylpentene-1,4-methylpentene-1 and other α-olefins or copolymers thereof, and copolymers thereof with other monomers. Such polymers may be used alone, or two or more kinds may be blended for use. Examples of other monomers for the above copolymers include, such as, (meth)acrylic acid, (meth)acrylic acid ester, vinyl acetate, vinyl alcohol, and maleic anhydride.

Representative examples of the polyolefin-based resin (A) include high-density/medium-density/low-density polyethylene, linear low-density polyethylene, polypropylene, an ethylene-(meth)acrylic acid copolymer, an ethylene-(meth)acrylic acid alkyl ester copolymer, an ethylene-vinyl acetate copolymer, an ethylene-vinyl alcohol copolymer, an ethylene-maleic anhydride copolymer, an propylene-ethylene block copolymer and random copolymer thereof, a propylene-ethylene-diene compound copolymer, and polybutene-1, poly4-methylpentene-1. Among them, preferred are ethylene-based copolymers including an ethylene structure as a structural unit, and particularly preferred is an ethylene-(meth)acrylic acid copolymer. When such preferred polyolefin-based resins (ethylene-based copolymers), particularly an ethylene-(meth)acrylic acid copolymer, are used, the resin (B) and the pigment (C) have good dispersibility and advantages are obtained including that the pigment (C) does not readily come away from a film formed of the resin composition even in a case where the pigment (C) is blended with a significant amount.

It is preferred that the mass average molecular weight of the polyolefin-based resin (A) ranges from 50,000 to 3,000,000, and particularly preferred is within the range from 100,000 to 500,000.

Considering the contained amount of the resin (B) and the pigment (C), the contained amount of the polyolefin-based resin (A) in the resin composition constituting the first layer 111 of the base material 11 ranges from 50 to 88 wt %, and preferably from 60 to 80 wt %.

Styrene-based resin as the resin (B) is a polymer having been polymerized or copolymerized using at least styrene as a building monomer, and examples thereof thus include copolymers with other monomers, for example, vinyl monomers such as butadiene; (meth)acrylic acid; (meth)acrylic acid ester; and (meth)acrylamide, but copolymers with olefin-based hydrocarbon are excluded from examples of styrene-based resin as the resin (B) because they fall under the above polyolefin-based resin (A).

Acrylic-based resin as the resin (B) is a polymer having been polymerized or copolymerized using at least (meth)acrylic acid and/or (meth)acrylic acid ester as a building monomer, and examples thereof thus include copolymers with other monomers such as vinyl monomer and styrene, but copolymers with olefin-based hydrocarbon are excluded from examples of acrylic-based resin as the resin (B) because they fall under the above polyolefin-based resin (A).

The above styrene-based resin and acrylic-based resin have a behavior that they are readily depolymerized by heating, and therefore, if the first layer 111 of the base material 11 contains the resin (B), then the through-holes 2 can be efficiently formed with favorable shape by using a thermal process, particularly a laser thermal process such as carbon dioxide laser process.

Examples of styrene-based resin include polystyrene resin, a styrene-acrylic acid copolymer, a styrene-acrylic acid ester copolymer, and a styrene-butadiene-styrene block copolymer, for example, and they may be used alone, or two or more kinds may be blended for use.

Examples of acrylic-based resin include (meth)acrylic resin and (meth)acrylic acid alkyl ester resin, for example, and they may be used alone, or two or more kinds may be blended for use.

As the resin (B), styrene-based resin or acrylic-based resin may be used either alone, or styrene-based resin and acrylic-based resin may be used in combination.

It is preferred that the mass average molecular weight of styrene-based resin and acrylic-based resin ranges from 50,000 to 1,000,000, and particularly preferred is within the range from 100,000 to 500,000.

The contained amount of the resin (B) in the resin composition constituting the first layer 111 of the base material 11 (if styrene-based resin and acrylic-based resin are used in combination, total amount thereof) ranges from 10 to 48 wt %, and preferably from 15 to 35 wt %. If the contained amount of the resin (B) is within such ranges, then the through-holes 2 can be efficiently formed with favorable shape as described above. If, on the other hand, the contained amount of the resin (B) exceeds 48 wt %, then the weather resistance and/or the solvent resistance of the first layer 111 of the base material 11 may possibly be deteriorated.

In the present embodiment, the pigment (C) is blended with a larger amount than ordinary blending amounts with respect to the above polyolefin-based resin (A) and resin (B) to provide an advantageous effect of mitigating thermal damage on the first layer 111 of the base material 11 thereby suppressing expansion of the inner diameter of the through-holes 2 when the through-holes 2 are formed in the first layer 111 by a thermal process, particularly by a laser thermal process, and more particularly by a carbon dioxide laser process. Moreover, an additional advantageous effect is also obtained that the weather resistance of the first layer 111 is enhanced.

Figure 2:
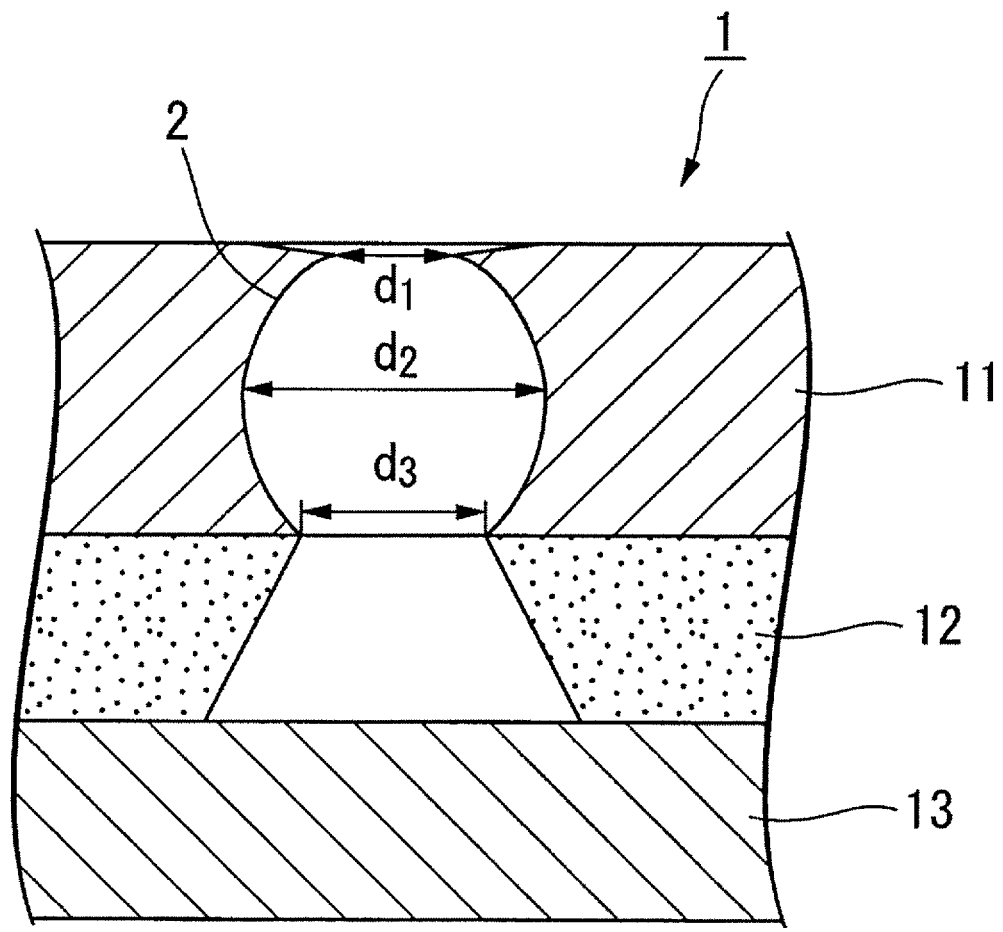
FIG. 2 is a partially enlarged cross-sectional views of a pressure-sensitive adhesive sheet, illustrating a through-hole having an expanded inner diameter.

Here, the inner diameter expansion of the through-holes 2 basically refers to a condition, as illustrated in FIG. 2, where the largest diameter $d_2$ of the through-holes 2 in the base material 11 is larger than the diameter $d_1$ of the through-holes 2 at the base material surface 1A and significantly larger than the diameter $d_3$ of the through-holes 2 at the interface between the base material 11 and the pressure-sensitive adhesive layer 12, but is not necessarily limited to such a condition, and also includes other conditions where the diameters ($d_1$ to $d_3$) of the through-holes 2 changes so as to give rise to the above problems. As the inner diameter of the through-holes 2 expands, the periphery of openings of the through-holes 2 tends to sink according to the diameter $d_2$ of the through-holes 2 (refer to FIG. 2).

The contained amount of pigment (C) in the resin composition constituting the first layer 111 of the base material 11 ranges from 2.0 to 30 wt %, and preferably from 2.5 to 20 wt %. If the contained of the pigment (C) is less than 2.0 wt %, then the above advantageous effects will not be obtained. If, on the other hand, the contained amount of pigment (C) exceeds 30 wt %, then the mechanical strength of the first layer 111 of the base material 11 and therefore of the pressure-sensitive adhesive sheet 1 will be reduced.

While the pigment (C) may be freely selected from known pigments, if the through-holes 2 are formed by a laser process, it is preferred to employ a pigment having its absorption peak or peaks within the wavelength region of the laser to be used. For example, in the case where the through-holes 2 are formed by carbon dioxide laser, it is preferred to employ a pigment having its absorption peak or peaks within the wavelength region (1087 to 962 $cm^{-1}$) of the carbon dioxide laser. This allows the through-holes 2 to be formed with a lower laser output.

Inorganic pigments and organic pigments are known as pigments, while inorganic pigments are superior in weather resistance and laser hole-forming workability. Therefore, it is preferred that the pigment (C) is at least one type selected from the group consisting of inorganic pigments.

Examples of inorganic pigments include such as carbon black, titanium black, talc, kaolin, bentonite, mica, titanium mica, bismuth oxychloride, zirconium oxide, yellow iron oxide, colcothar (red iron oxide), black iron oxide, ultramarine, chromium oxide, chromium hydroxide, and calamine. Among them, carbon black is particularly preferred. Carbon black is notably superior in the above effect of preventing the inner diameter expansion.

Here, it is known in general that the highest blending amount of carbon black in a polyolefin-based film is 1.00% ("Carbon Black Handbook", second edition, edited by Carbon Black Association and published by Toshosyuppan Co. Ltd., May 25, 1972, p. 361, Table 3-1). That is, the contained amount of pigment (C) as being 2.0 wt % or more in the resin composition constituting the first layer 111 of the base material 11 as described above is an amount twice or more as much as the contained amount according to common technical knowledge in the art. Although it is unclear as to the blending amount of pigment in the black opaque base material comprised of a polyolefin-based thermoplastic elastomer used in Example 16 of Patent Document 2, it seems to be no more than 1.00 wt % in the film.

Note that the first layer 111 of the base material 11 in the present embodiment may also include various additives such as organic fillers, ultraviolet absorbing agents, and glidants.

On the other hand, the second layer 112 of the base material 11 contains a polyolefin-based ionomer resin (D) as a main constituent, and is preferably comprised of a resin composition which contains 97 to 100 wt % of the polyolefin-based ionomer resin (D) and 0 to 3 wt % of a pigment (E).

The polyolefin-based ionomer resin (D) is a material having high scratch-resistance performance, and hence the base material 11 having the second layer 112 on its surface side, thus the pressure-sensitive adhesive sheet 1, comes to be of high scratch-resistance without any coat layer, by employing the polyolefin-based ionomer resin (D) as a main constituent of the second layer 112 of the base material 11. In addition, as described above, the first layer 111 of the base material 11 comprises an olefin-based material containing 50 wt % or more of the polyolefin-based resin (A) while the second layer 112 of the base material 11 also comprises an olefin-based material containing the polyolefin-based ionomer resin (D) as its main constituent, whereby the first and second layers exhibit good adhesiveness therebetween because both the layers are of materials belonging to the same system, and therefore, delamination between the first layer 111 and the second layer 112 and cracks are suppressed from occurring even when the pressure-sensitive adhesive layer 1 is expanded at the time of applying. Moreover, the base material 11 can also be prevented from curling because the elastic modulus of the first layer 111 and the elastic modulus of the second layer 112 are closer with each other than with the elastic modulus of a coat agent.

The polyolefin-based ionomer resin (D) is a resin comprising polyolefin as a main constituent and is obtained by introducing ionic cross-linking between molecules.

A carboxyl group is used as the anion part of ionic cross-linking for the polyolefin-based ionomer resin (D) while a metal ion or an organic-based ion is used as the cation part. Specifically, an ethylene-unsaturated carboxylic acid copolymer, an unsaturated carboxylic acid graft modified resin, or a mixture thereof is used such that the carboxyl group thereof is partially or fully neutralized with a metal cation, an organic amine ion, or a mixed ion thereof. Note that the ethylene-unsaturated carboxylic acid copolymer may be one copolymerized with a third component such as an unsaturated carboxylic acid ester or a vinyl ester.

Examples of the unsaturated carboxylic acid include an unsaturated carboxylic acid having from 3 to 8 carbon atoms or a half ester of dibasic carboxylic acid, such as acrylic acid, methacrylic acid, maleic acid, maleic acid anhydride, maleic acid mono-methyl ester, and maleic acid mono-ethyl ester.

As the unsaturated carboxylic acid graft modified resin, preferred ones have a base resin of polyolefin such as polyethylene and polypropylene or of an ethylene-based copolymer such as an ethylene-vinyl acetate copolymer, an ethylene-acrylic acid copolymer, and an ethylene-ethyl acrylate copolymer.

Examples of the metal cation include cation of Na, K, Li, Ca, Mg, Zn, Cu, Co, Ni, Mn, Al, and other cation. Examples of the organic amine ion include mono or poly amine etc. such as n-hexyl amine, hexamethylene diamine, ethylene diamine, triethylene tetramine, and 1,3-bis-aminomethyl cyclohexane. Examples of the mixed ion thereof include complex ion of transition metal such as Zn, Co and Cu with an organic amine, etc.

Among the above cations, Zn ion is particularly preferable to be used. By employing a Zn-based ionomer resin using Zn ion, the scratch-resistance performance is enhanced.

It is preferred that the degree of neutralization of carboxyl group by the above cation ranges from 1 to 100 mol %, because if it is unduly low, then the affinity with the polyolefin-based resin is reduced to deteriorate the adhesiveness with the first layer 111.

A resin on the basis of an ethylene-acrylic acid copolymer is particularly preferred as the polyolefin-based ionomer resin (D).

The pigment (E) for use may be one which is similar to the pigment (C) described for the first layer 111 of the base material 11, and carbon black is particularly preferred among them. The second layer 112 of the base material 11 contains the pigment (E) thereby to improve the weather resistance performance, suppress the tendency of sinking at the periphery of openings of the through-holes 2, and allow the through-holes 2 to be formed with a reduced laser output.

It is preferred that the contained amount of the pigment (E) in the resin composition constituting the second layer 112 of the base material 11 is 3 wt % or less, and particularly preferred is 2 wt % or less. The contained amount of the pigment (E) of more than 3 wt % may possibly deteriorate the scratch-resistance performance of the second layer 112 of the base material 11.

Note that the second layer 112 of the base material 11 in the present embodiment may also include various additives such as organic fillers, ultraviolet absorbing agents, and glidants.

The base material 11 can be manufactured by an ordinary method, and the base material 11 comprising the first layer 111 and the second layer 112 may be obtained, for example, by molding using co-extrusion of a resin composition for constituting the first layer 111 and a resin or resin composition for constituting the second layer 112. Note that the pigment (C) and/or the pigment (E) may be blended as a master batch at the time of molding the base material 11.

Here, unless defeating the purpose in the present embodiment, one or more decoration layers may also be formed overlying the surface of the pressure-sensitive adhesive layer 12-side of the first layer 111 by a method such as printing, typing, application of a coating material, transfer from a transfer sheet, vapor deposition and sputtering. Such decoration layers may be formed over the entire surface of the first layer 111, or may partially be formed. Note that, if such decoration layers are formed over the base material 11, they are referred to as being included in the base material.

The thickness of the base material 11 ranges ordinarily from about 5 to 500 μm, preferably from about 10 to 400 μm, and most preferably from about 20 to 300 μm, but may be freely changed depending on the intended use of the pressure-sensitive adhesive sheet 1.

The ratio of the thickness of the first layer 111 and the thickness of the second layer 112 in the base material 11 (first layer:second layer) is 80:20 to 97:3.0, and preferably 90:10 to 97:3.0. If the thickness of the second layer 112 is unduly thick compared to that of the first layer 111, then the through-holes 2 may not be readily obtained with a stable shape. If, on the other hand, the thickness of the second layer 112 is unduly thin compared to that of the first layer 111, then the base material 11 may not be stably formed and the scratch-resistance performance may also be deteriorated.

It is preferred that the total luminous transmittance of the base material 11 is 0.1% or less when the thickness of the base material 11 is 100 μm. Such a low total luminous transmittance exhibits that the pigment (C) (and the pigment (E)) is (are) sufficiently dispersed in the first layer 111 (and the second layer 112) of the base material 11. This allows for the above effect of preventing the inner diameter expansion for each through-hole 2 to be formed in the base material 11. In addition, the pigment (C) (and the pigment (E)) for absorbing light is (are) sufficiently dispersed to thereby improve the light stabilization performance of the base material 11, resulting in that the base material 11 has an excellent weather resistance performance.

The type of the pressure-sensitive adhesive constituting the pressure-sensitive adhesive layer 12 may be one which allows the through-holes 2 to be formed, such as, but not particularly limited to, an acrylic-based, polyester-based, polyurethane-based, rubber-based, silicone-based, or other appropriate type. Further, the pressure-sensitive adhesive may be of emulsion type, solvent type, or solventless type, and may also be of crosslinking type or non-crosslinking type.

The thickness of the pressure-sensitive adhesive layer 12 ranges ordinarily from about 1 to 300 μm, and preferably from about 5 to 100 μm, but may be freely changed depending on the intended use of the pressure-sensitive adhesive sheet 1.

The material of the release liner 13 is not particularly limited. As such a material there may be used a film comprising a resin such as polyethylene terephthalate, polypropylene, polyethylene or the like, a foamed film thereof, or paper such as glassine paper, coated paper, laminated paper or the like, which has been subjected to a release treatment using a release agent such as a silicone-based release agent, a fluorine-based release agent, or a carbamate containing a long-chain alkyl group.

The thickness of the release liner 13 ranges ordinarily from about 10 to 250 μm, and preferably from about 20 to 200 μm. Further, the thickness of the release agent in the release liner 13 ranges ordinarily from 0.05 to 5 μm, and preferably from 0.1 to 3 μm.

It is preferred that the hole diameter of the through-holes 2 ranges from 0.1 to 300 μm, and particularly preferred is from 0.5 to 150 μm, throughout the base material 11 and the pressure-sensitive adhesive layer 12 (at all positions in the thickness direction of the base material 11 and the pressure-sensitive adhesive layer 12). If the hole diameter of the through-holes 2 is less than 0.1 μm, then air or gas will not readily escape, whereas if the hole diameter exceeds 300 μm, then the through-holes 2 will be highly visible and the appearance of the pressure-sensitive adhesive sheet will thus be deteriorated. In addition, the mechanical strength of the pressure-sensitive adhesive sheet 1 may possibly be reduced if the hole diameter exceeds 300 μm. Notably when the through-holes 2 are required not to be visible within a close range, it is preferred that the hole diameter at the surface 1A of the base material 11 is set as being less than a value ranging from 0.1 to 40 μm.

The through-holes 2 may be formed, such as, but not particularly limited to, by means of water jet, micro-drill, precision press, or thermal process. In the present embodiment, the through-holes 2 are preferably formed by a thermal process, more preferably by a laser thermal process, and further preferably by a laser thermal process using a carbon dioxide laser. Such a process for forming the through-holes 2 allows for specifically exerting the above effect of preventing the inner diameter expansion.

It is preferred that the hole density of the through-holes 2 is 500 to 50,000 holes/100 cm$^2$, and particularly preferred is 1,000 to 10,000 holes/100 cm$^2$. If the hole density of the through-holes 2 is less than 500 holes/100 cm$^2$, then air or gas may not readily escape, whereas if the hole density of the through-holes 2 exceeds 50,000 holes/100 cm$^2$, then the tensile strength and/or the tear strength of the pressure-sensitive adhesive sheet 1 may possibly be reduced.

Note that, although the through-holes 2 in the pressure-sensitive adhesive sheet 1 according to the present embodiment are to pass through from the upper surface (base material surface 1A) of the base material 11 to the lower surface (pressure adhesive face 1B) of the pressure-sensitive adhesive layer 12, they may further pass through the release liner 13 as well.

The pressure-sensitive adhesive sheet 1 according to the present embodiment comprises the release liner 13, but the present invention is not limited thereto, and the release liner 13 may be omitted. Also, the size, shape and so forth of the pressure-sensitive adhesive sheet 1 according to the present embodiment are not particularly limited in any way. For instance, the pressure-sensitive adhesive sheet 1 may be a tape-like sheet (pressure-sensitive adhesive tape), comprising only the base material 11 and the pressure-sensitive adhesive layer 12, wound up in the form of a roll.

As described hereinbefore, in the pressure-sensitive adhesive sheet 1 according to the present embodiment, the through-holes 2 have a shape in which the inner diameter thereof is suppressed from being expanded in the pressure-sensitive adhesive sheet 1 because the resin (B) is blended in the first layer 111 of the base material 11 and the pigment (C) is blended with a specific blending amount. Therefore, problems caused by the inner diameter expansion of the through-holes 2 are prevented from occurring, that is, the appearance of the pressure-sensitive adhesive sheet 1 is prevented from being deteriorated due to sinking of the periphery of openings of the through-holes 2.

Moreover, the pressure-sensitive adhesive sheet 1 according to the present embodiment has the second layer 112, which contains the polyolefin-based ionomer resin (D) as a main component, on the surface side of the base material 11, thereby providing an excellent scratch-resistance performance without using an additional coat layer. Furthermore, the second layer 112 is of olefin-based likewise the first layer 111 and thus has a high adhesiveness to the first layer 111, so that the problems such as delamination and cracks do not occur even when the pressure-sensitive adhesive sheet 1 is expanded.

[Manufacture of Pressure-Sensitive Adhesive Sheet]

Figure 3:
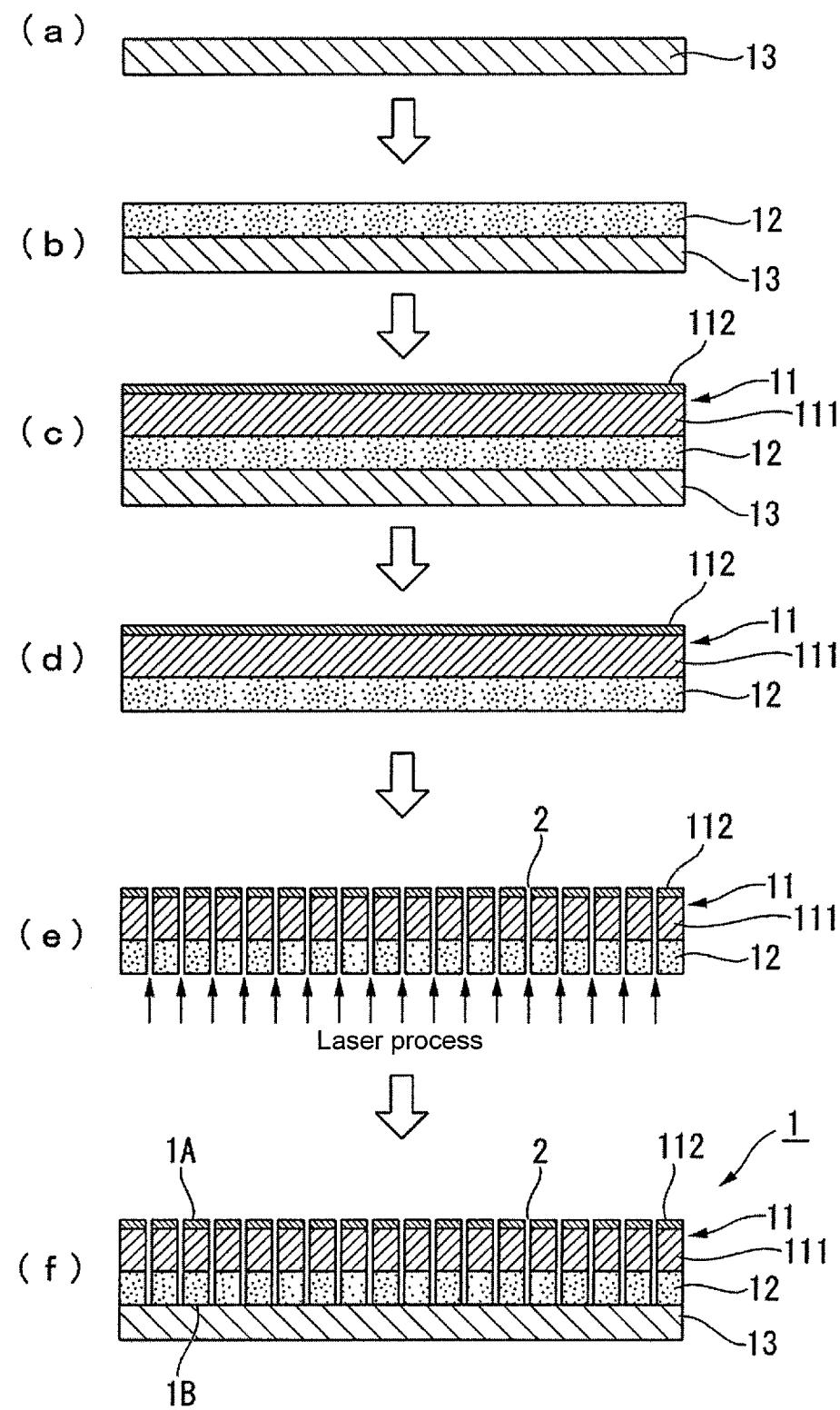
FIG. 3 depicts views illustrating one example of a manufacturing method for the pressure-sensitive adhesive sheet according to one embodiment of the present invention.

One example of a manufacturing method for the pressure-sensitive adhesive sheet 1 according to the above embodiment will be described with reference to (a) to (f) of FIG. 3.

In the present manufacturing method, the base material 11 comprising the first layer 111 and the second layer 112 is preliminarily prepared. As shown in (a) to (b) of FIG. 3, the pressure-sensitive adhesive layer 12 is firstly formed on a release-treated surface of the release liner 13. The pressure-sensitive adhesive layer 12 may be formed by: preparing a coating agent which contains an adhesive to constitute the pressure-sensitive adhesive layer 12 and if required further contains some solvent; applying the coating agent to the release-treated surface of the release liner 13 using a coater, such as roll coater, knife coater, roll knife coater, air knife coater, die coater, bar coater, gravure coater, or curtain coater; and drying it to obtain the pressure-sensitive adhesive layer 12.

Subsequently, as shown in (c) of FIG. 3, the first layer 111-side of the base material 11 is superposed onto the surface of the pressure-sensitive adhesive layer 12 to provide a laminate which comprises: the base material 11 having its second layer 112 on the surface side; the pressure-sensitive adhesive layer 12; and the release liner 13. Thereafter, as shown in (d) of FIG. 3, the release liner 13 is peeled off from the pressure-sensitive adhesive layer 12, followed by forming through-holes 2 in a laminate comprising the base material 11 and the pressure-sensitive adhesive layer 12 as shown in (e) of FIG. 3, followed by applying again the release liner 13 to the pressure-sensitive adhesive layer 12 as shown in (f) of FIG. 3.

It is preferred that the formation of the through-holes 2 is performed by a thermal process. Examples of types of the thermal process include, such as, a laser thermal process, a thermal process using hot needles, and a thermal process by melting and boring, among which the laser thermal process is preferred because it allows for readily forming fine through-holes having good air-escaping ability with a desired hole density. Even if the through-holes 2 are formed using any of such thermal processes, the pressure-sensitive adhesive sheet 1 can be obtained to have a good appearance because the inner diameter of the through-holes 2 is suppressed from being expanded and a molten material is not readily produced.

Types of laser used in the laser thermal process include carbon dioxide ($CO_2$) laser, $TEA-CO_2$ laser, YAG laser, UV-YAG laser, $YVO_4$ laser, YLF laser and other lasers, among which the carbon dioxide laser is preferred in terms of production efficiency, cost and the like.

Note that the formation of the through-holes 2 using the laser thermal process involves a burst process (burst mode) in which laser light is continuously irradiated onto one site until each through-hole 2 is formed and which is thus superior from the viewpoint of thermal efficiency, or a cycle process (cycle mode) in which plural through-holes 2 are uniformly formed through sequential irradiation of laser light onto plural sites and which is superior from the view point of reducing thermal impact on an object to be processed, and either mode may be used for the above laser thermal process.

When performing the laser thermal process, it is preferred that the laser light is irradiated from the side of the pressure-sensitive adhesive layer 12 towards the side of the base material 11. By performing the laser thermal process from the side of the pressure-sensitive adhesive layer 12, the hole diameter of the through-holes 2 at the base material surface 1A becomes smaller than the hole diameter at the pressure-sensitive adhesive face 1B of the pressure-sensitive adhesive layer 12. Further, by irradiating the laser light directly onto the pressure-sensitive adhesive layer 12 after temporarily peeling off the release liner 13, the output energy of the laser can be reduced. Reducing the output energy of the laser allows for forming neatly shaped through-holes 2 with fewer molten materials and thermally deformed portions due to the heat.

While the peripheral edges of openings of the through-holes 2 may not readily be formed thereon with molten materials by the laser thermal process, even if such molten materials attach, a protective film previously applied to the surface of the base material 11 can prevent molten materials from attaching. As the protective film, there can be used a known protective film that is used for surface protection of construction materials or metal plates. Further, when the base material 11 is produced by a casting method, the laser thermal process may be performed in a state where a carrier sheet for casting is still laminated on the surface of the base material 11.

In the above manufacturing method, the pressure-sensitive adhesive layer 12 is formed by applying to the release liner 13 to be formed, and the formed pressure-sensitive adhesive layer 12 and the base material 11 are then laminated to each other, but the present invention is not limited thereto, and the pressure-sensitive adhesive layer 12 may directly be applied to the base material 11 to be formed thereon.

[Use of Pressure-Sensitive Adhesive Sheet]

At the time of attaching the pressure-sensitive adhesive sheet 1 to an adherend, the release liner 13 is firstly removed from the pressure-sensitive adhesive layer 12.

Next, the pressure-sensitive adhesive sheet 1 is pressed against the adherend so that the exposed pressure-sensitive adhesive face 1B of the pressure-sensitive adhesive layer 12 is brought into close contact with the adherend. At this time, the air between the adherend and the pressure-sensitive adhesive face 1B of the pressure-sensitive adhesive layer 12 is escaped out of the base material surface 1A via the through-holes 2 formed in the pressure-sensitive adhesive sheet 1, thereby resulting in that the adherend and the pressure-sensitive adhesive face 1B are unlikely to entrap air therebetween, and formation of air entrapments is thus prevented. Even if air entrapments would be formed as a result of air becoming caught during the attaching operations, re-pressing the air entrapment portions or air entrapment peripheral portions that encompass the air entrapment portions enables the air to escape out of the surface of the base material 1A via the through-holes 2, and the air entrapments are thus eliminated. Such removal of air entrapments is also possible after a long period of time has elapsed from the time of applying the pressure-sensitive adhesive sheet 1.

Further, even if a gas is generated from the adherend after the pressure-sensitive adhesive sheet 1 has been applied to the adherend, such gas may escape out of the base material surface 1A via the through-holes 2 formed in the pressure-sensitive adhesive sheet 1 to thereby prevent blisters from occurring in the pressure-sensitive adhesive sheet 1.

EXAMPLE

The present invention will hereinafter be more specifically described with reference to examples etc., but the scope of the present invention is not to be limited to these examples etc.

Example 1

Kneaded pellets for the first layer were prepared from a mixture of 65 wt % of an ethylene-methacrylic acid copolymer (NUCREL N0903HC manufactured by DUPONT-MITSUI POLYCHEMICALS CO., LTD.) as the polyolefin-based resin, 30 wt % of a styrene-butadiene-styrene copolymer (TR2250 manufactured by JSR Corporation) as the styrene-based resin, and 5 wt % of carbon black (SUNBLACK 200 manufactured by ASAHI CARBON CO., LTD.) as the pigment, using a biaxial extrusion kneading machine (KZW25TWIN-30MG-STM manufactured by TECH-NOVEL CORPORATION). A film with thickness of 100 μm and the layer thickness ratio of the first layer:the second layer=97:3 was then produced from the above kneaded pellets for the first layer and a polyolefin-based ionomer (HIMILAN 1706, a zinc ion cross-linked ethylene-acrylic acid copolymer, manufactured by DUPONT-MITSUI POLYCHEMICALS CO., LTD.) for the second layer, using an extrusion tester (Labo-plastomill 30C150 manufactured by Toyo Seiki Seisaku-Sho, LTD). The obtained film was used as a base material for a pressure-sensitive adhesive sheet. The blending of materials constituting that base material and the layer thickness ratio are shown in Table 1 (here and hereinafter).

A coating agent of acrylic-based solvent-type pressure sensitive adhesive (PK manufactured by LINTEC Corporation) was applied using a knife coater to the release-treated surface of a release liner (FPM-11, thickness: 175 μm, manufactured by LINTEC Corporation), which was obtained by laminating a polyethylene resin onto both faces of woodfree paper and subjecting one face thereof to release treatment using a silicone-based release agent, and the coating agent was then dried at 90 degrees C. during 1 minute to have a thickness of 30 μm after drying. The pressure-sensitive adhesive layer obtained in such a manner was superposed thereto with the above film as the base material so that the first layer was in contact with the pressure-sensitive adhesive layer, and the surface of the second layer in the base material was attached thereon with a protective sheet (E-2035, thickness: 60 μm, manufactured by SUMIRON Corporation) having a removable pressure-sensitive adhesive layer to thereby provide a laminate of 5-layers structure.

The release liner was peeled off from the above laminate, and the residual laminate was irradiated thereto with a carbon dioxide laser (using YB-HCS03 manufactured by Matsushita Industrial Equipment Co., Ltd., two-shot burst process, frequency: 10,000 Hz, pulse width: 25 μsec (first shot)/12 μsec (second shot)) from the side of the pressure-sensitive adhesive layer to form through-holes with a hole density of 2,500 holes/100 cm$^2$ (hole pattern:parallel-type, pitch distance: 2 mm). Thereafter, the above release liner was superposed again onto the pressure-sensitive adhesive layer, and the protective sheet was removed from the surface of the base material to provide a pressure-sensitive adhesive sheet.

Example 2

A pressure-sensitive adhesive sheet was manufactured in a similar manner to Example 1 except for setting the layer thickness ratio as being the first layer:the second layer=80:20.

Example 3

Kneaded pellets for the second layer were prepared from a mixture of 97 wt % of a polyolefin-based ionomer (HIMILAN 1706, a zinc ion cross-linked ethylene-acrylic acid copolymer, manufactured by DUPONT-MITSUI POLYCHEMICALS CO., LTD.) and 3 wt % of carbon black (SUNBLACK 200 manufactured by ASAHI CARBON CO., LTD.) as the pigment, using the biaxial extrusion kneading machine (KZW25TWIN-30MG-STM manufactured by TECH-NOVEL CORPORATION).

A film with thickness of 100 μm and the layer thickness ratio of the first layer:the second layer=97:3 was then produced from kneaded pellets for the first layer prepared in a similar manner to Example 1 and the above kneaded pellets for the second layer using the extrusion tester (Labo-plastomill 30C150 manufactured by Toyo Seiki Seisaku-Sho, LTD), and that film was used as the base material of a pressure-sensitive adhesive sheet. The pressure-sensitive adhesive sheet was manufactured in a similar manner to Example 1 except for using the obtained base material.

Example 4

A pressure-sensitive adhesive sheet was manufactured in a similar manner to Example 3 except for setting the layer thickness ratio as being the first layer:the second layer=80:20.

Comparative Example 1

A pressure-sensitive adhesive sheet was manufactured in a similar manner to Example 1 except for setting the layer thickness ratio as being the first layer:the second layer=70:30.

Comparative Example 2

A pressure-sensitive adhesive sheet was manufactured in a similar manner to Example 1 except for setting the layer thickness ratio as being the first layer:the second layer=99: 1.0.

Comparative Example 3

A film with thickness of 100 μm (without second layer) was produced from kneaded pellets for the first layer prepared in a similar manner to Example 1 using the extrusion tester (Labo-plastomill 30C150 manufactured by Toyo Seiki Seisaku-Sho, LTD), and that film was used as the base material of a pressure-sensitive adhesive sheet. The pressure-sensitive adhesive sheet was manufactured in a similar manner to Example 1 except for using the obtained base material.

Comparative Example 4

A cross-linking agent-containing coating liquid was prepared by adding 2.5 parts by mass of a polyisocyanate compound-based cross-linking agent (CORONATE HL manufactured by Nippon Polyurethane Industry Co., Ltd.) to 100 parts by mass (solid content) of an acrylic-based polymer-type coating liquid (ULS-1935LH, contained amount of solid content: 30 wt %, manufactured by Ipposha Oil Industries Co., Ltd.) for a protective coat.

The above cross-linking agent-containing coating liquid was applied to the surface of a base material prepared in a similar manner to Comparative Example 3 using a Mayer bar No. 12, and heat-treated at 60 degrees C. during 1 minute to form a coat layer of thickness of 5 μm after drying. The layer thickness ratio was the base material:the coat layer=95:5. A pressure-sensitive adhesive sheet was manufactured in a similar manner to Example 1 except for using the obtained base material with the coat layer.

[Tests]

(1) Observation of Through-Hole Shape

The pressure-sensitive adhesive sheets obtained in the Examples and Comparative Examples were cut at portions of the through-holes, and diameter measurement was performed each for the diameter of the through-holes at the base material surface, the largest diameter in the base material, the diameter at the interface between the base material and the pressure-sensitive adhesive layer, and the diameter at the pressure-sensitive adhesive face using a digital microscope (VHX-200 manufactured by KEYENCE CORPORATION). In addition, five areas of 1 cm² were randomly chosen, and the number of holes passing through within each area was counted for calculating the average number of through-holes per 1 cm². Results are given in Table 2.

(2) Infrared Spectrophotometric Measurement

Measurement was performed for the added pigment in the base materials used in the Examples and Comparative Examples by universal ATR method using a Fourier transform infrared spectrophotometer (FT-IR Spectrum One manufactured by Perkin Elmer Inc.) to check the presence or absence of absorption peaks (FT-IR absorption peaks) within the wavelength region (1087 to 962 cm$^{-1}$) of the laser used. Results are given in Table 2. In Table 2, "O" denotes presence of absorption and "X" denotes absence of absorption.

(3) Measurement of Total Luminous Transmittance

Each total luminous transmittance (%) of the base materials used in the Examples and the Comparative Examples was measured in compliance with JIS K 7361: 1996 using a haze meter (NDH5000 manufactured by NIPPON DENSHOKU INDUSTRIES CO., LTD). Results are given in Table 2.

(4) Appearance Check

Each appearance of the pressure-sensitive adhesive sheets obtained in the Examples and Comparative Examples was checked in such a manner as described below. Results are given in Table 3.

Each pressure-sensitive adhesive sheet (size: 30 mm×30 mm) removed therefrom with the release liner was attached to a melamine-coated plate, and the appearance of the surface of the pressure-sensitive adhesive sheet was checked by the naked eye under indoor fluorescent light tubes. Note that the distance from the eyes to the pressure-sensitive adhesive sheet was set as being about 30 cm, and the angle for viewing the pressure-sensitive adhesive sheet was widely changed. As results thereof, "O" denotes a case where no through-hole was recognized by the naked eye, and "X" denotes a case where through-holes were recognized by the naked eye.

(5) Air Entrapment Removability Test 1

The pressure-sensitive adhesive sheets obtained in the Examples and Comparative Examples were subjected to an air entrapment removability test as described below. Results are given in Table 3.

Each pressure-sensitive adhesive sheet (size: 50 mm×50 mm) removed therefrom with the release liner was attached to a flat melamine-coated plate to be formed therebetween with an air entrapment having a diameter of about 15 mm, and the pressure-sensitive adhesive sheet was pressed with a squeegee, thereafter being checked as to whether the air entrapment could be removed or not. As results thereof, "O" denotes a case where the air entrapment could be removed, and "X" denotes a case where the air entrapment could not be removed.

(6) Air Entrapment Removability Test 2

The pressure-sensitive adhesive sheets obtained in the Examples and Comparative Examples were subjected to an air entrapment removability test as described below. Results are given in Table 3.

Each pressure-sensitive adhesive sheet (size: 50 mm×50 mm) removed therefrom with the release liner was attached to a 70 mm×70 mm melamine-coated plate having a partially spherical depression (recess) with a diameter of 15 mm and a maximum depth of 1 mm (an air entrapment thus existing between the depression and the pressure-sensitive adhesive sheet), and the pressure-sensitive adhesive sheet was pressed with a squeegee, thereafter being checked as to whether the air entrapment could be removed or not. As results thereof, "O" denotes a case where the pressure-sensitive adhesive sheet followed the recess of the melamine-coated plate and the air entrapment could be removed, and "X" denotes a case where the pressure-sensitive adhesive sheet did not follow the recess of the melamine-coated plate and the air entrapment could not be removed (including a case where the air entrapment still remained even with smaller size).

(7) Measurement of Breaking Strength

The base materials used in the Examples and Comparative Examples were measured for breaking strength (MPa) at an extension rate of 200 mm per minute in compliance with JIS K7161:1994 and JIS K 7127:1999 using a universal tester (AUTOGRAPH AG-IS 500N manufactured by SHIMADZU CORPORATION). Note that the measurement of breaking strength was performed in each of the machine direction (MD) and the cross-machine direction (CD) of the base material. Results are given in Table 3.

(8) Scratch-Resistance Performance Test

The pressure-sensitive adhesive sheets obtained in the Examples and Comparative Examples were subjected to a scratch-resistance performance test by using a cotton cloth (Kanakin manufactured by Ipposha Oil Industries Co., Ltd.) impregnated with isopropyl alcohol (IPA) and reciprocating it ten times on the base material surface of the pressure-sensitive adhesive sheet at a load of 4.9N. Before and after the test, the gloss values were measured to calculate the change rate thereof. With respect to the gloss value, a 60° gloss value was measured in compliance with JIS K 7105:1981 using a gloss meter "VG2000" manufactured by NIPPON DENSHOKU INDUSTRIES CO., LTD. Ones having the change rate of the gloss value of less than 20% were to be accepted ("O"), while ones having the change rate of the gloss value of 20% or more were to be unaccepted ("X"). Results are given in Table 3.

(9) Expanding Crack-Resistance Performance Test

Samples were prepared by cutting the pressure-sensitive adhesive sheets obtained in the Examples and Comparative Examples into a size of 25 mm×100 mm and removing the release liners therefrom. Each sample was set to a precision universal tester (AUTOGRAPH AG-IS manufactured by SHIMADZU CORPORATION) and expanded by 10% (extension rate: 200 mm/min). The appearance of the pressure-sensitive adhesive sheet after 10%-expansion was evaluated to be classified into "O" where cracks, floating, peeling and the like were absent, and "X" where cracks, floating, peeling or the like was present. Results are given in Table 3.

TABLE 1

|  | First layer | | | Second layer | | | Layer thickness ratio | | |
| --- | --- | --- | --- | --- | --- | --- | --- | --- | --- |
|  | A (wt %) | B (wt %) | C (wt %) | D (wt %) | E (wt %) | Coat layer | First layer | Second layer | Coat layer |
| Example 1 | 65 | 30 | 5 | 100 | 0 | Absent | 97 | 3 | — |
| Example 2 | 65 | 30 | 5 | 100 | 0 | Absent | 80 | 20 | — |
| Example 3 | 65 | 30 | 5 | 97 | 3 | Absent | 97 | 3 | — |
| Example 4 | 65 | 30 | 5 | 97 | 3 | Absent | 80 | 20 | — |

TABLE 1-continued

|  | First layer | | | Second layer | | | Layer thickness ratio | | |
| --- | --- | --- | --- | --- | --- | --- | --- | --- | --- |
|  | A (wt %) | B (wt %) | C (wt %) | D (wt %) | E (wt %) | Coat layer | First layer | Second layer | Coat layer |
| Comparative Example 1 | 65 | 30 | 5 | 100 | 0 | Absent | 70 | 30 | — |
| Comparative Example 2 | 65 | 30 | 5 | 100 | 0 | Absent | 99 | 1 | — |
| Comparative Example 3 | 65 | 30 | 5 | — | — | Absent | 100 | — | — |
| Comparative Example 4 | 65 | 30 | 5 | — | — | Acrylic coat | 95 | — | 5 |

A: Ethylene-methacrylic acid copolymer (Nucrel N0903HC manufactured by DUPONT-MITSUI POLYCHEMICALS CO., LTD.)
B: Styrene-butadiene-styrene copolymer (TR2250 manufactured by JSR Corporation)
C: Carbon black (SUNBLACK 200 manufactured by ASAHI CARBON CO., LTD.)
D: Ethylene-based ionomer (HIMILAN 1706, a zinc ion cross-linked ethylene-acrylic acid copolymer, manufactured by DUPONT-MITSUI POLYCHEMICALS CO., LTD.)
E: Carbon black (SUNBLACK 200 manufactured by ASAHI CARBON CO., LTD.)

TABLE 2

|  | Diameter of through-holes (μm) | | | | Presence or absence of FT-IR peaks | Total luminous transmittance (%) |
| --- | --- | --- | --- | --- | --- | --- |
|  | Base material surface | Largest diameter | Base material/ pressure-sensitive adhesive layer | Pressure sensitive adhesive face | Number of through-holes (holes/cm$^2$) | |
| Example 1 | 25 to 30 | 65 | 55 to 65 | 65 to 75 | 25 | ○ | 0.0 |
| Example 2 | 25 to 30 | 65 | 55 to 65 | 65 to 75 | 25 | ○ | 0.0 |
| Example 3 | 25 to 30 | 60 | 55 to 60 | 60 to 75 | 25 | ○ | 0.0 |
| Example 4 | 20 to 25 | 65 | 60 to 65 | 60 to 75 | 20 | ○ | 0.0 |
| Comparative Example 1 | 20 to 25 | 65 | 60 to 65 | 65 to 80 | 12 | ○ | 0.0 |
| Comparative Example 2 | 25 to 30 | 65 | 60 to 65 | 65 to 75 | 25 | ○ | 0.0 |
| Comparative Example 3 | 25 to 30 | 65 | 60 to 65 | 65 to 75 | 25 | ○ | 0.0 |
| Comparative Example 4 | 25 to 30 | 65 | 60 to 65 | 65 to 75 | 25 | ○ | 0.0 |

TABLE 3

|  | Appearance check | Air entrapment removability 1 | Air entrapment removability 2 | Breaking strength (MPa) | | Scratch-resistance performance | Expanding crack-resistance performance |
| --- | --- | --- | --- | --- | --- | --- | --- |
|  |  |  |  | MD | CD |  |  |
| Example 1 | ○ | ○ | ○ | 23.4 | 21.8 | ○ | ○ |
| Example 2 | ○ | ○ | ○ | 25.6 | 24.1 | ○ | ○ |
| Example 3 | ○ | ○ | ○ | 23.8 | 22.1 | ○ | ○ |
| Example 4 | ○ | ○ | ○ | 25.3 | 24.4 | ○ | ○ |
| Comparative Example 1 | ○ | ○ | X | 26.8 | 25.4 | ○ | ○ |
| Comparative Example 2 | ○ | ○ | ○ | 23.5 | 21.7 | X | ○ |
| Comparative Example 3 | ○ | ○ | ○ | 23.0 | 21.6 | X | ○ |
| Comparative Example 4 | ○ | ○ | ○ | 23.2 | 22.4 | ○ | X |

As understood from Table 1 to Table 3, the pressure-sensitive adhesive sheets (Examples 1 to 4) using base materials in accordance with the conditions of the present invention had excellent air-escaping ability, and exhibited a good appearance, with through-holes invisible to the naked eye and with no expansion of the inner diameter. In addition, the pressure-sensitive adhesive sheets also exhibited excellent scratch-resistance performance, expanding crack-resistance performance, and mechanical strength.

INDUSTRIAL APPLICABILITY

The pressure-sensitive adhesive sheet of the present invention can be preferably used in cases where air entrapments or blisters are likely to occur in general in the pressure-sensitive adhesive sheet, for example, in cases where the surface area of the pressure-sensitive adhesive sheet is large, or a gas is released from the adherend, or in a case where scratch-resistance performance is required.

| Explanation of Reference Numerals | |
|---|---|
| 1 | pressure-sensitive adhesive sheet |
| 11 | base material |
| 111 | first layer |
| 112 | second layer |
| 12 | pressure-sensitive adhesive layer |
| 13 | release liner |
| 1A | base material surface |
| 1B | pressure sensitive adhesive face |
| 2 | through-hole |

The invention claimed is:

1. A pressure-sensitive adhesive sheet comprising:
a base material; and
a pressure-sensitive adhesive layer and formed therein with a plurality of through-holes passing through from one surface to the other surface,
the base material comprising a first layer positioned on a pressure-sensitive adhesive layer-side and a second layer positioned on a side opposite to the pressure-sensitive adhesive layer,
the first layer comprising a resin composition, the resin composition containing:
50 to 88 wt % of a polyolefin-based resin (A);
10 to 48 wt % of a styrene-based resin and/or an acrylic-based resin (B) excluding the polyolefin-based resin (A); and
2.0 to 30 wt % of a pigment (C),
the second layer containing a polyolefin-based ionomer resin (D) as a main constituent, and
the ratio of thickness between the first layer and the second layer being 80:20 to 97:3.0.

2. The pressure-sensitive adhesive sheet according to claim 1, wherein the pigment (C) has an absorption peak within a wavelength region of a carbon dioxide laser.

3. The pressure-sensitive adhesive sheet according to claim 1, wherein the pigment (C) is at least one selected from the group consisting of inorganic pigments.

4. The pressure-sensitive adhesive sheet according to claim 1, wherein the pigment (C) is carbon black.

5. The pressure-sensitive adhesive sheet according to claim 1, wherein a hole diameter of the through-holes at a surface of the base material is smaller than a hole diameter of the through-holes at a pressure-sensitive adhesive face of the pressure-sensitive adhesive layer.

6. The pressure-sensitive adhesive sheet according to claim 1, wherein the second layer comprises a resin composition containing 97 to 100 wt % of the polyolefin-based ionomer resin (D) and 0 to 3 wt % of a pigment (E).

7. The pressure-sensitive adhesive sheet according to claim 6, wherein the polyolefin-based resin (A) is an ethylene-based copolymer including an ethylene structure as a structural unit.

8. The pressure-sensitive adhesive sheet according to claim 6, wherein the polyolefin-based resin (A) is an ethylene-(meth)acrylic acid copolymer.

9. The pressure-sensitive adhesive sheet according to claim 6, wherein the pigment (C) has an absorption peak within a wavelength region of a carbon dioxide laser.

10. The pressure-sensitive adhesive sheet according to claim 6, wherein the pigment (C) is at least one selected from the group consisting of inorganic pigments.

11. The pressure-sensitive adhesive sheet according to claim 1, wherein the polyolefin-based resin (A) is an ethylene-based copolymer including an ethylene structure as a structural unit.

12. The pressure-sensitive adhesive sheet according to claim 11, wherein the polyolefin-based resin (A) is an ethylene-(meth)acrylic acid copolymer.

13. The pressure-sensitive adhesive sheet according to claim 11, wherein the pigment (C) has an absorption peak within a wavelength region of a carbon dioxide laser.

14. The pressure-sensitive adhesive sheet according to claim 11, wherein the pigment (C) is at least one selected from the group consisting of inorganic pigments.

15. The pressure-sensitive adhesive sheet according to claim 1, wherein the polyolefin-based resin (A) is an ethylene-(meth)acrylic acid copolymer.

16. The pressure-sensitive adhesive sheet according to claim 15, wherein the pigment (C) has an absorption peak within a wavelength region of a carbon dioxide laser.

17. The pressure-sensitive adhesive sheet according to claim 15, wherein the pigment (C) is at least one selected from the group consisting of inorganic pigments.

18. The pressure-sensitive adhesive sheet according to claim 1, wherein the through-holes are formed by a thermal process.

19. The pressure-sensitive adhesive sheet according to claim 18, wherein the thermal process is a laser thermal process.

20. The pressure-sensitive adhesive sheet according to claim 19, wherein the laser used in the laser thermal process is a carbon dioxide laser.

* * * * *